(12) United States Patent
Rizzo

(10) Patent No.: US 8,850,754 B2
(45) Date of Patent: Oct. 7, 2014

(54) MOLDED SOLAR PANEL RACKING ASSEMBLY

(71) Applicant: Nathan T. Rizzo, Williamsville, NY (US)

(72) Inventor: Nathan T. Rizzo, Williamsville, NY (US)

(73) Assignee: DynoRaxx, Inc., Buffalo, NY (US)

( * ) Notice: Subject to any disclaimer, the term of this patent is extended or adjusted under 35 U.S.C. 154(b) by 0 days.

(21) Appl. No.: 13/651,413

(22) Filed: Oct. 13, 2012

(65) Prior Publication Data
US 2013/0220403 A1 Aug. 29, 2013

Related U.S. Application Data

(60) Provisional application No. 61/548,209, filed on Oct. 17, 2011, provisional application No. 61/548,024, filed on Oct. 17, 2011.

(51) Int. Cl.
| | | |
|---|---|---|
| E04D 13/18 | (2014.01) | |
| E04H 14/00 | (2006.01) | |
| F16B 7/04 | (2006.01) | |
| H01L 31/042 | (2014.01) | |
| F16B 21/12 | (2006.01) | |
| F16B 21/06 | (2006.01) | |

(52) U.S. Cl.
CPC ............ *F16B 21/065* (2013.01); *F16B 7/0446* (2013.01); *Y02B 10/12* (2013.01); *Y02B 10/20* (2013.01); *H01L 31/0422* (2013.01); *F16B 21/125* (2013.01)
USPC ...... 52/173.3; 136/251; 136/259; 248/346.03; 248/237; 220/781; 220/608; D13/102

(58) Field of Classification Search
USPC .......... 136/291, 251, 244, 259; 126/704, 623, 126/621, 622; 211/26.2; 220/781, 675, 608; 248/346.03, 237, 148; D13/102; 52/173.1, 173.3, 27
See application file for complete search history.

(56) References Cited

U.S. PATENT DOCUMENTS

| | | | | |
|---|---|---|---|---|
| 5,595,021 A | * | 1/1997 | Ripley et al. | 47/66.5 |
| 6,105,316 A | * | 8/2000 | Bottger et al. | 52/173.3 |
| 6,453,629 B1 | * | 9/2002 | Nakazima et al. | 52/173.3 |
| 7,900,397 B2 | * | 3/2011 | Mischo | 47/65.9 |
| 8,255,691 B2 | * | 8/2012 | Yi et al. | 713/176 |
| 8,281,524 B2 | * | 10/2012 | Hund et al. | 52/173.3 |
| 8,291,652 B2 | * | 10/2012 | Saillard | 52/173.3 |
| 8,418,419 B1 | * | 4/2013 | Aseere et al. | 52/173.3 |
| 8,485,483 B2 | * | 7/2013 | Rees | 248/237 |
| 8,511,006 B2 | * | 8/2013 | Reisdorf et al. | 52/173.3 |
| 8,567,132 B2 | * | 10/2013 | Rothschild et al. | 52/173.3 |
| 2010/0212714 A1 | * | 8/2010 | Rothschild et al. | 136/244 |
| 2011/0103083 A1 | * | 5/2011 | Ku et al. | 362/428 |
| 2012/0031469 A1 | * | 2/2012 | Loois et al. | 136/251 |
| 2012/0199180 A1 | * | 8/2012 | Salam | 136/251 |
| 2012/0223032 A1 | * | 9/2012 | Rothschild et al. | 211/41.1 |

* cited by examiner

*Primary Examiner* — Chi Q Nguyen
(74) *Attorney, Agent, or Firm* — Paul T. Lavoie, Esq.

(57) ABSTRACT

The present invention comprises a stackable ballasted roof mounting solar panel mount unit integrally formed into a single piece. The mount unit comprises a plurality of generally elevated side walls of a ballast receiving basket. Each side walls defines a downwardly facing open channel that is configured to receive a corresponding side wall from a corresponding solar panel mount in a stacking relation. The mount unit further comprises a first pair of posts, wherein each of the first pair of posts forms a downwardly facing post receiving first mouth that is configured to receive a corresponding post from a corresponding first pair of posts of a corresponding solar panel mount in a stacking relation.

15 Claims, 20 Drawing Sheets

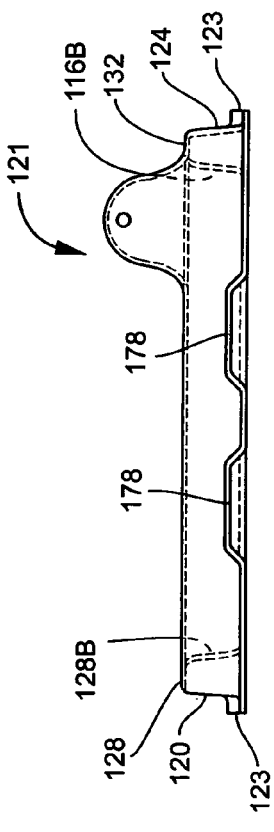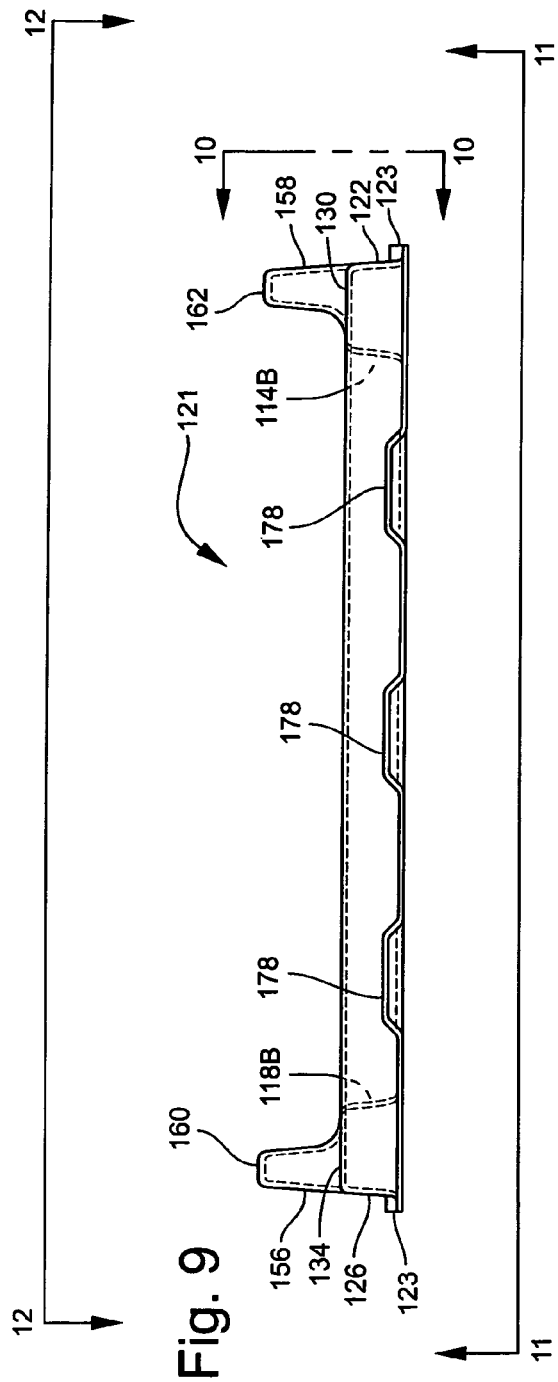

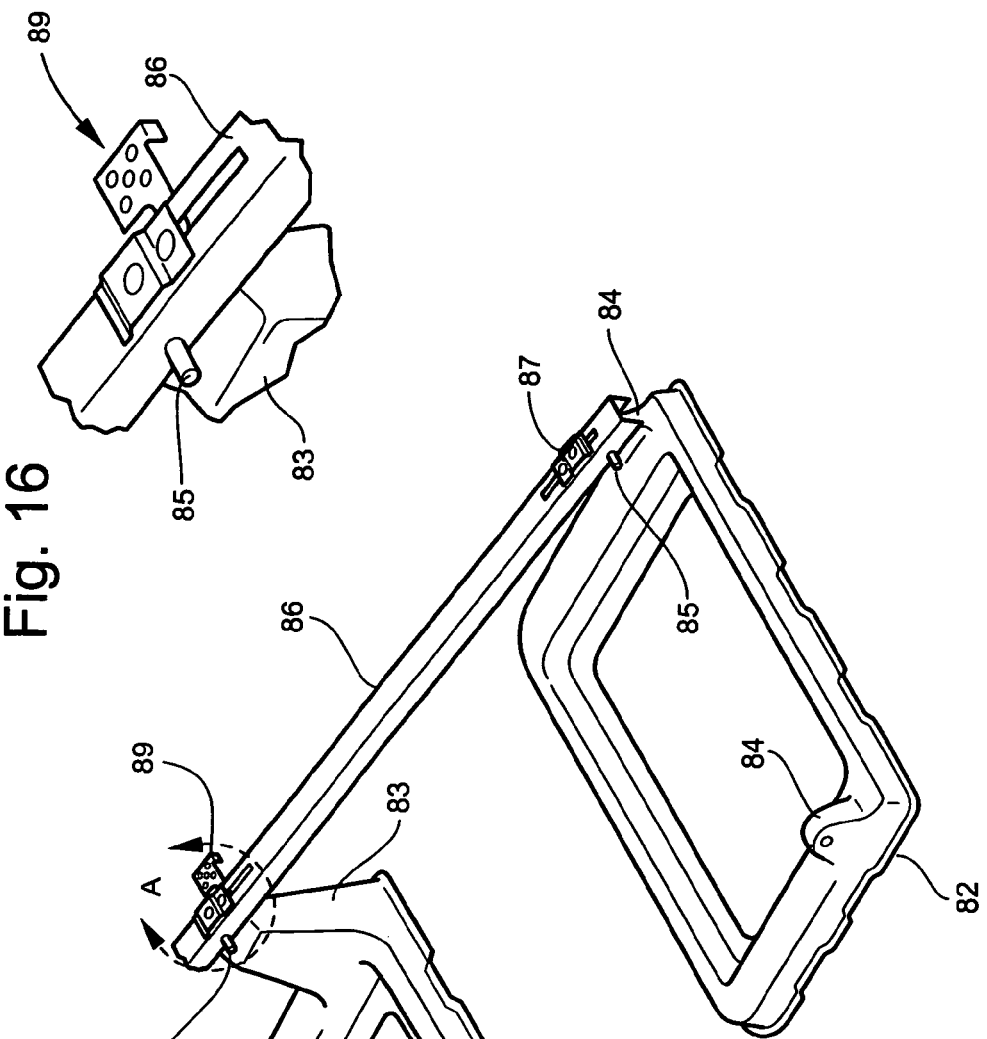
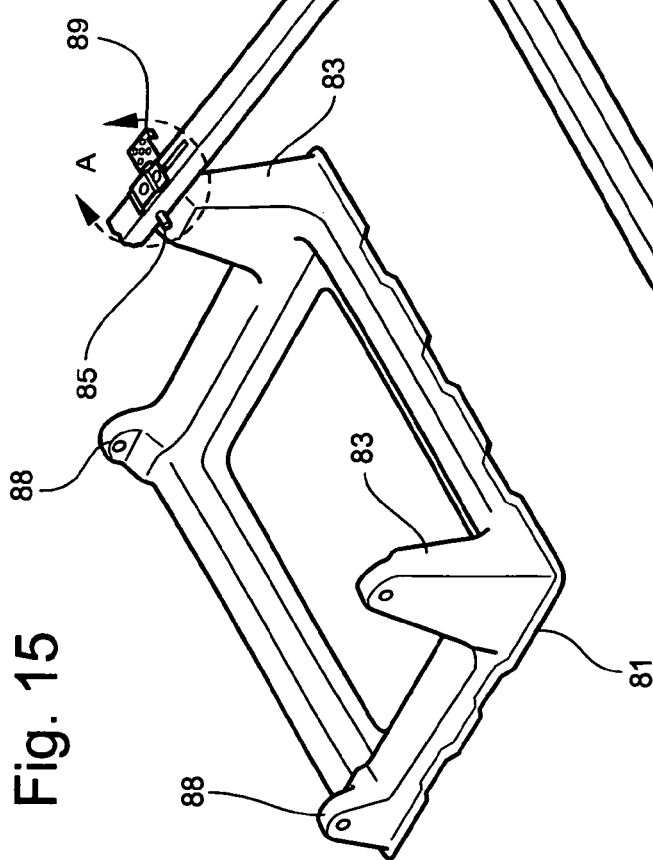
Fig. 15
Fig. 16

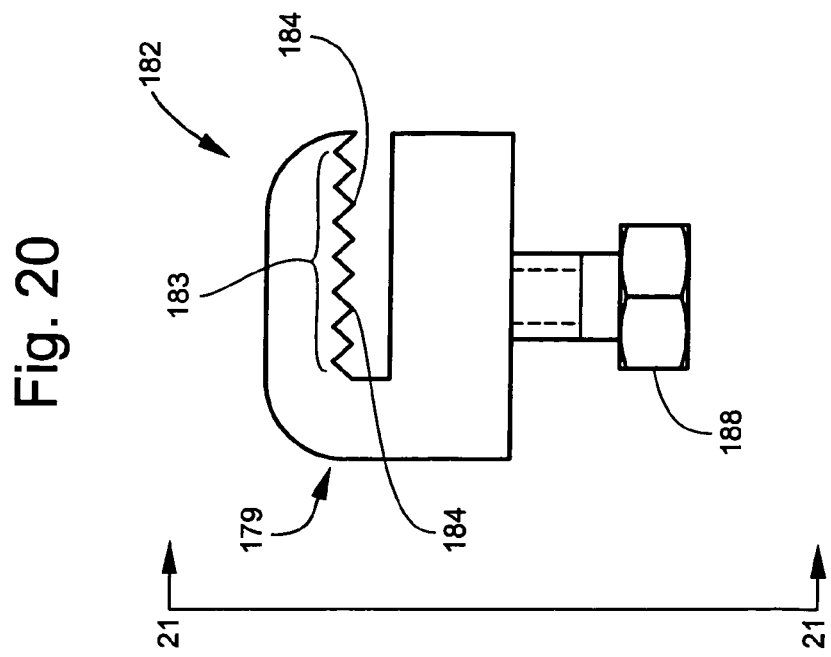
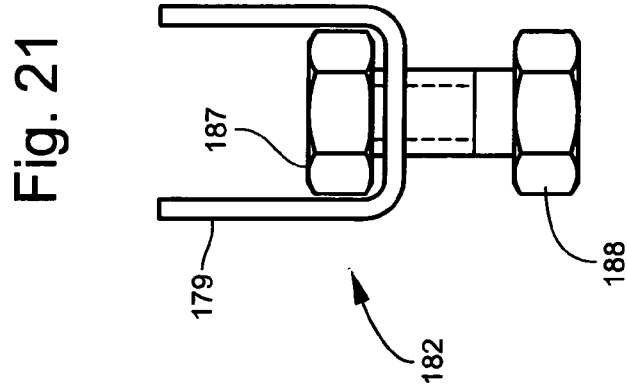
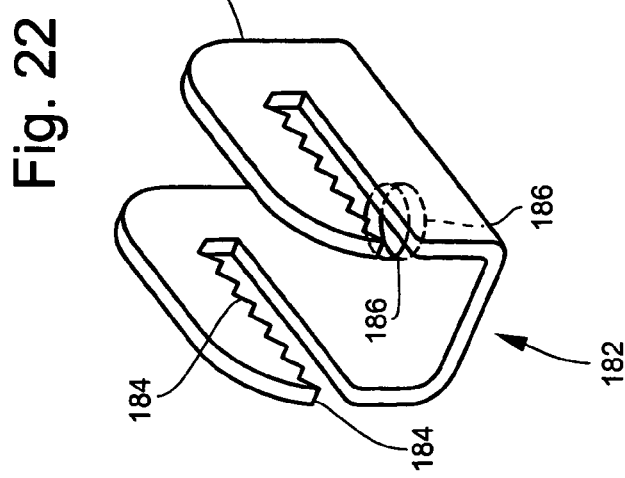

MOLDED SOLAR PANEL RACKING ASSEMBLY

CROSS-REFERENCE TO RELATED APPLICATIONS

This application claims the benefit of U.S. Provisional Application No. 61/548,209 filed Oct. 17, 2011, and U.S. Provisional Application No. 61/548,024 filed Oct. 17, 2011, which are both incorporated by reference herein in their entirety.

BACKGROUND OF THE INVENTION

1. Field of Invention

This invention relates generally to systems for mounting solar panels or photovoltaic cells and more specifically to ballasted roof mounted racking systems for mounting photovoltaic cells.

2. Discussion of Related Art

Solar energy provides the opportunity to generate electricity without consumption of fossil fuels and is considered clean technology. In recent years, the development of technology for solar thermal systems and photovoltaic systems has improved the overall viability of solar energy. Increasing prices of fossil fuel and the prospect of expending world oil reserves has created a demand for alternative energy sources that can supplement and/or replace some of the energy needs consumed presently by fossil fuels. Thus, the demand for solar energy has increased. Because of the overall accessibility of solar energy, individuals or small businesses can own and control all or a significant portion of its energy production free from dependence upon the power grid. With the advances of electric powered automobiles, even transportation needs can be met by solar generated electricity. Presently, solar power technology is one of the most widely-accessible form of alternative fuel to the general population of the world. All is needed is access to direct sunlight.

The cost of solar panel technology includes not only cost of the photovoltaic panels, but a significant investment installation equipment and the labor to construct a solar electric system. Thus, a technology advance that reduces the cost of installation of photovoltaic modules (whether through reducing material cost, shipping costs, or labor costs) makes photovoltaic technology more viable and attractive from an investment perspective. The quality of installation also affects the efficiency of solar panel installation. The direction of the solar panels relative to the sun, the angle of the solar panels relative to the horizon, the density of solar panels in a given area, as well as position of solar panels relative to other panels can have a positive or negative effect on performance of the solar powered system.

A large percentage of commercial solar panel systems are installed on generally flat roofs of office buildings. Generally flat means that the roof is designed to be generally horizontal without a predefined pitch. It should be understood that while generally flat, flat roofs are often uneven due to settling of the building, construction imperfections, etc. A flat roof structure is an attractive place to locate a solar panel installation because there is often a large surface area of unused space with relatively few obstructions of sunlight. The traffic on a roof is typically restricted. Because access is restricted, the likelihood of intentional or accidental damage or theft is naturally reduced with relatively inexpensive safety precautions. Consequently, there is a significant effort in the solar panel industry to design effective flat roof mounts or racks to support arrays of solar panels on flat roofs.

The ability to assemble with one additional row of solar panels without causing overlap of the solar panels in sunlight or compromising optimal positioning would be a great advantage. Moreover, it would be advantageous if photovoltaic panels could be installed by an unskilled laborer or layperson (do-it-yourselfer) without a lot of formal training. It would be further advantageous if the system could be installed by hand without tools. It would be further advantageous if the product was light-weight, could be stacked or configured in a compact manner to ship a larger number of system components per unit of shipping volume and thereby reduce shipping costs. An additional advantage would be to have a system that can be easily adapted to avoid obstructions in the roof such as common rooftop fixtures without having to cut and resize parts of the solar panel system. Reducing installation time reduces labor cost making solar technology more accessible to the common individual.

U.S. Patent Publication 2008/0210221 to Genschorek discloses a relatively compact frame assembly that mounts solar panels at an angle for mounting on a flat structure such as a roof or ground. The metal frame system is supported by carrier profile elements with feet having holes forming connections to connect the carrier profile elements to the ground or roof surface—presumably by bolt, screw or penetrating fastener. The system has multiple parts requiring factory or on site assembly—potentially increasing product or installation cost.

U.S. Pat. No. 8,281,524 to Hund is a stackable wire frame design. The wire design is relatively lightweight, compact and stackable. The system is designed to have one framework support one panel so the system does not have the benefit of interconnectedness. Furthermore, the system is made from a wire grate connected by welds at wire intersections. It is pressed into the desired form. The wire is potentially vulnerable to damage by bending, corrosion, or breakage at weld points.

U.S. Pat. No. 6,105,316 to Bottger discloses an injection or blow molded device for supporting solar panels. The device has a bottom wall and a rear wall and two side walls integrally joined. Concrete blocks are place in the interior of the device. The solar panel is fastened to side edges of the bottom wall and rear wall. Each device supports a solar panel individually. There is one vertical member for each side. Thus, the panel array is not structurally interconnected.

U.S. Publ. No. 2006/0196128 to Duke discloses a mounting for solar panels with fixings on the front and side that enable it to be easily attached to other mountings for solar arrays. The devices are interconnected and stackable.

U.S. Publ. No. 2012/0036799 to Kneip discloses an injection molded support device that is compact and stackable. The height of the base is greater than its width and thus top-heavy relying upon the panels for side-to side stability. Thus, the device could have improved stability from side to side. Each device potentially supports one side of two adjacent panels.

U.S. Publ. No. 2012/0223032 to Rothschild discloses a solar panel mounting system of injection molded bases that are designed to support the panels at their respective corners. The bases can be nested like buckets for easy transport. Each device potentially supports four panels. Each bucket has four side walls.

Additionally, there is a need for systems that are lighter weight, easier to install and can be transported and lifted to rooftops with greater efficiency because a greater number of units can fit on a similar size pallet.

Thus, there still exists a need for a system that has many of the needs expressed above. The present invention addresses these and other needs.

SUMMARY OF THE INVENTION

The present invention comprises a stackable, ballasted, roof mounting unit integrally formed into a single piece. Each side is formed by two-walls for extra strength and stability. The mount unit comprises a plurality of generally elevated side walls of a ballast receiving basket. Each of the generally elevated side walls taper upward and inward from a generally downward facing peripheral edge to an apex ridge of the wall to form the outer face of each of the side walls. The generally elevated side walls taper downward and inward from the apex ridge of the wall to form the inner face. The side wall further extends inward from the base of the inner face to form a ballast supporting basket lip. Each side walls defines a downwardly facing open channel that is configured to receive a corresponding side wall from a corresponding solar panel mount in a stacking relation.

The mount unit further comprises a first pair of posts, wherein each of the first pair of posts extend upward from the peripheral edge to the top of the first pair of posts at a first predetermined height above the generally elevated side wall to form the outer side of each of the first pair of posts. Each of the first pair of posts taper downwardly and inwardly from the top of each of the first pair of posts to form the generally inner side of each of the posts. Each of the first pair of posts forms a downwardly facing post receiving first mouth that is configured to receive a corresponding post from a corresponding first pair of posts of a corresponding solar panel mount in a stacking relation.

In one embodiment, the mount unit further comprises a second pair of posts. Each of the second pair of posts extends upward from the peripheral edge to a second predetermined height to form the outer side of a support post. The support posts taper downwardly and inwardly from the second predetermined height to form the generally inner side of each of the posts. The second predetermined height is above the generally elevated side wall. Each of the second pair of posts forms a downwardly facing post receiving mouth that is configured to receive a corresponding post from a corresponding solar panel mount in a stacking relation.

The mounting unit of one embodiment where the peripheral edge has a plurality of raised gaps around the base to allow water to flow under the base without obstruction.

The mounting unit of another embodiment, wherein the basket has a large hollow part that is cut away to prevent water from pooling in the basket.

In still another embodiment, there is a plurality of units according to one or more of the embodiments set forth above. The plurality of units is arranged in a single vertically aligned stack. A first of the plurality of units is placed onto the bottom and a second of the plurality of units is vertically aligned with the first of the plurality of units. The distance between any point on the first of the plurality of units and the same corresponding point on the second of the plurality of units is less than one-half, preferably less than one quarter, more preferably less than one-eighth, and even more preferably less than one tenth of the height of the distance from the peripheral lip to the apex ridge of any one unit.

The plurality of stacked units of one embodiment, wherein the plurality are arranged in one vertically aligned stack on a pallet. A first of the plurality of units is placed directly onto the pallet on the bottom of the stack and a second of the plurality of units is vertically aligned with and stacked upon the first of the plurality of units, wherein distance between any point on the first of the plurality of stacked units and the same corresponding point on the second of the plurality of units is less than one-half, preferably less than one quarter, more preferably less than one-eighth, and even more preferably less than one tenth of the height of the distance from the peripheral lip to the apex ridge of any one unit.

In one embodiment, unassembled rails and other hardware can be stacked between the first pair of posts and the second pair of posts in the plurality of stacked units on the pallet.

In one embodiment, there is a solar panel mounting system. The solar panel mounting system comprises a front row of units as described above. Wherein the first pair of posts of each front row unit is the only pair of posts on the unit. The mounting system further comprises a first medial row of units as described above where the first pair of posts of each first medial row unit are defined as front posts and the second pair of post of each first medial row units are defined as back posts and the back posts are smaller than the front posts.

The system further comprises a plurality of rails extending from and fastened to the top of the first pair of posts of each front row unit. The rails extend towards and are fastened to the top of front posts of the first medial row of units that are placed behind the front row of units;

The system also has a row of solar panels in solar panel frames. The solar panel frames are fastened to respective pairs of adjacent rails. The system also has a plurality of ground wires that are connected to adjacent solar panels in the front row and the first medial row by ground wire fasteners. The ground wire fasteners create an electrical connection between the panel frames. In one embodiment, the fasteners are sufficient to break the annealed surface of the solar panel frame to effect a favorable connection.

The present invention is described hereinafter in Detailed Description of the Invention in reference to the drawings and examples, which are intended to teach, describe and exemplify one or more embodiments of the invention and is in no way intended to limit the scope of the invention.

BRIEF DESCRIPTION OF THE DRAWINGS

FIG. 9 is a front elevated view of the solar panel mounting unit of FIG. 8.

FIG. 10 is a side elevated view of the solar panel mounting unit of FIG. 9 taken along the lines 10-10.

FIG. 15 is a solar panel mounting system of one embodiment.

FIG. 16 is an enlarged view of the fastening system of FIG. 15 taken around circle A.

FIG. 20 is a side view of a C-clamp housing of one embodiment.

FIG. 21 is a rear view of the housing of FIG. 20 taken along the lines 21-21.

FIG. 22 is an unassembled C-clamp housing.

DETAILED DESCRIPTION

Figure 1:
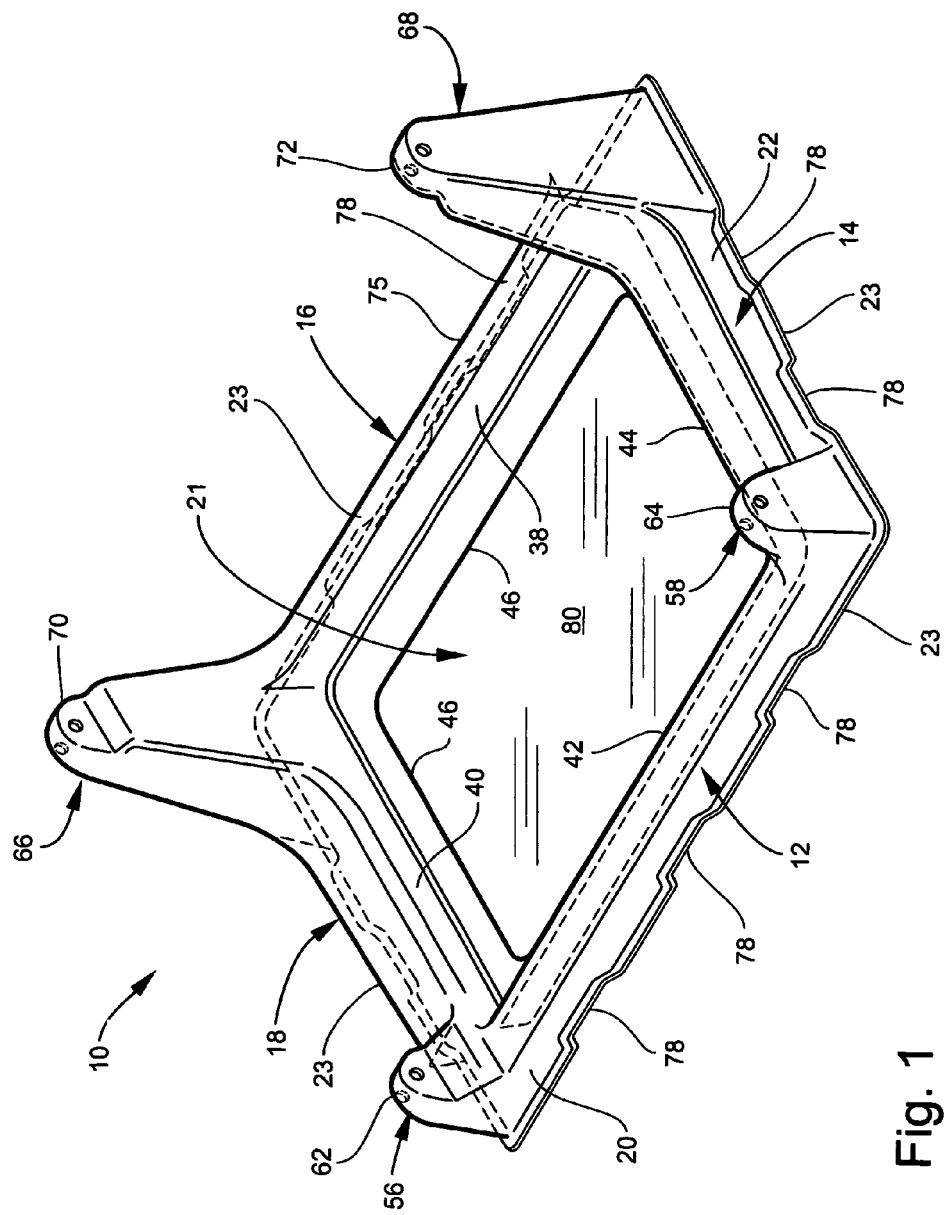
FIG. 1 is a perspective view of a four posted mounting unit of one embodiment of the present invention.
Figure 3:
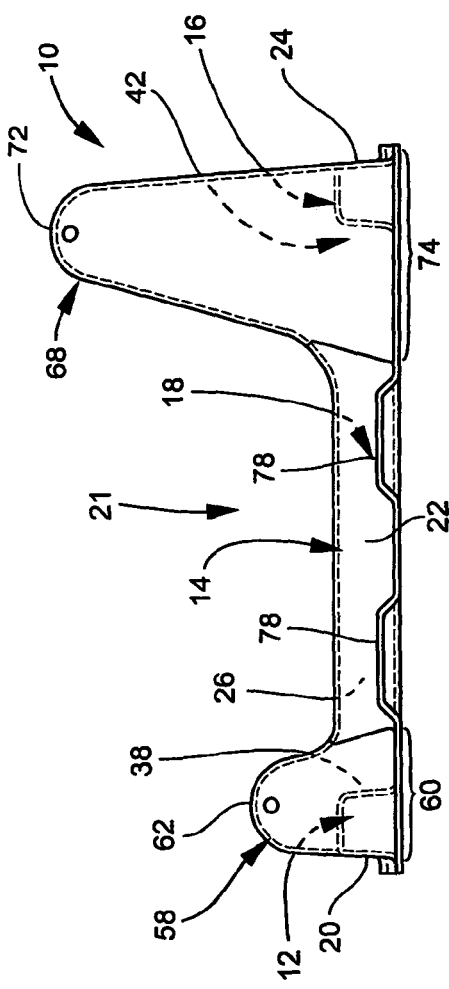
FIG. 3 is a side elevated view of the solar panel mounting unit of FIG. 2 taken along the lines 3-3.
Figure 2:
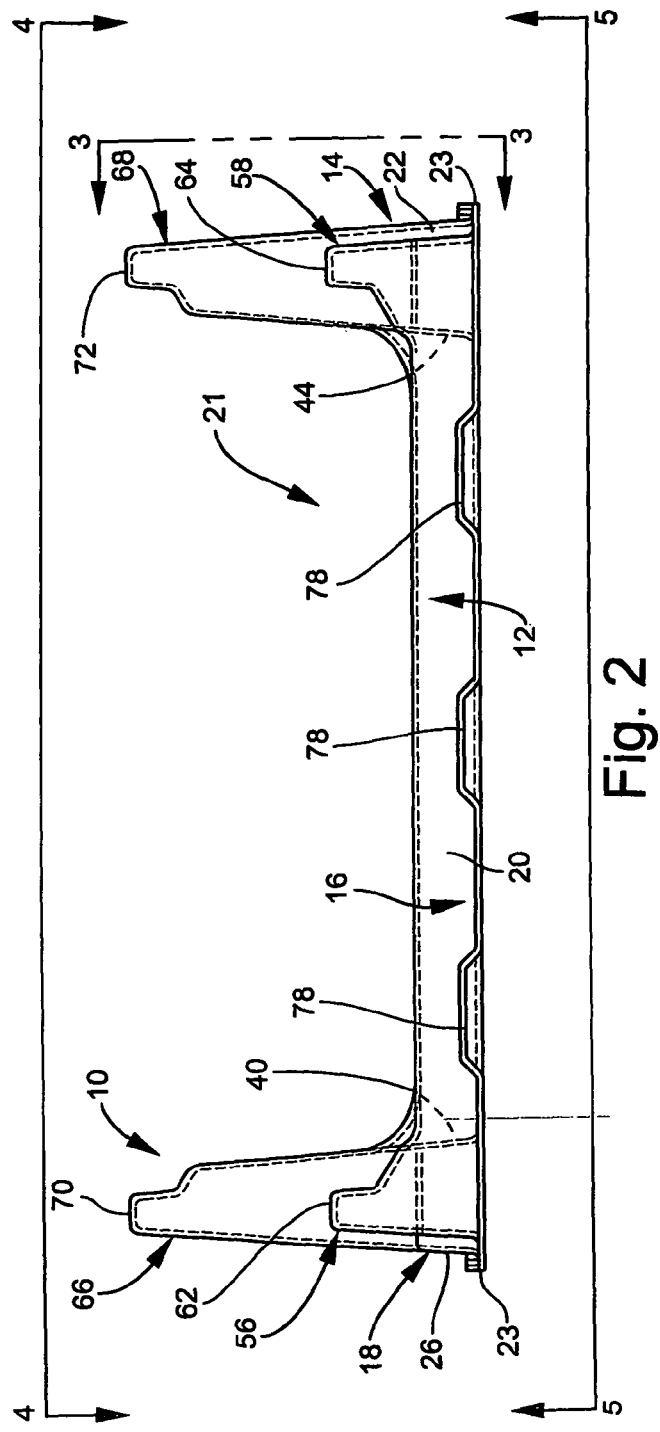
FIG. 2 is a front elevated view of the solar panel mounting unit of FIG. 1.
Figure 4:
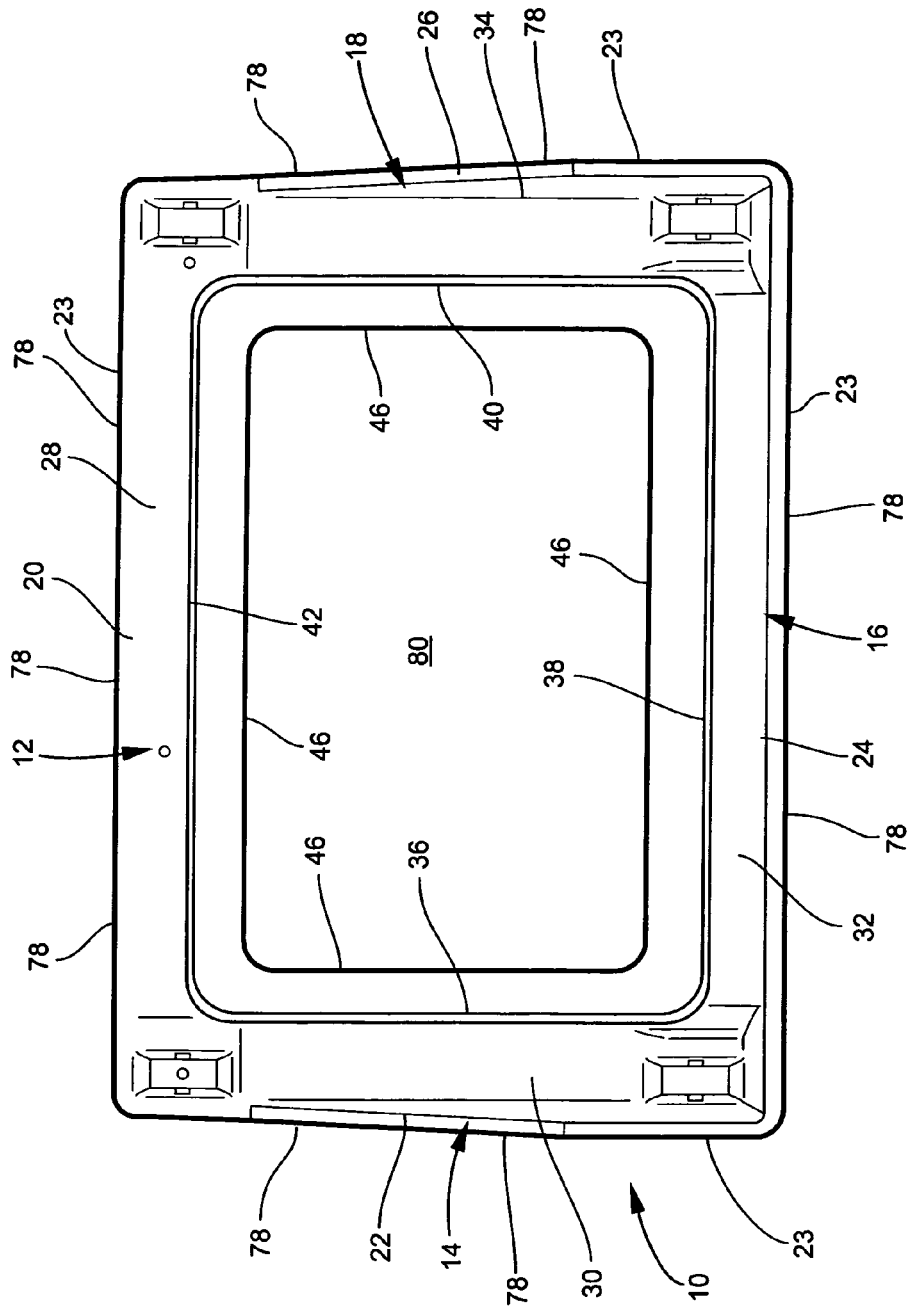
FIG. 4 top view of the solar panel mounting unit of FIG. 2 taken along the lines 4-4.
Figure 5:
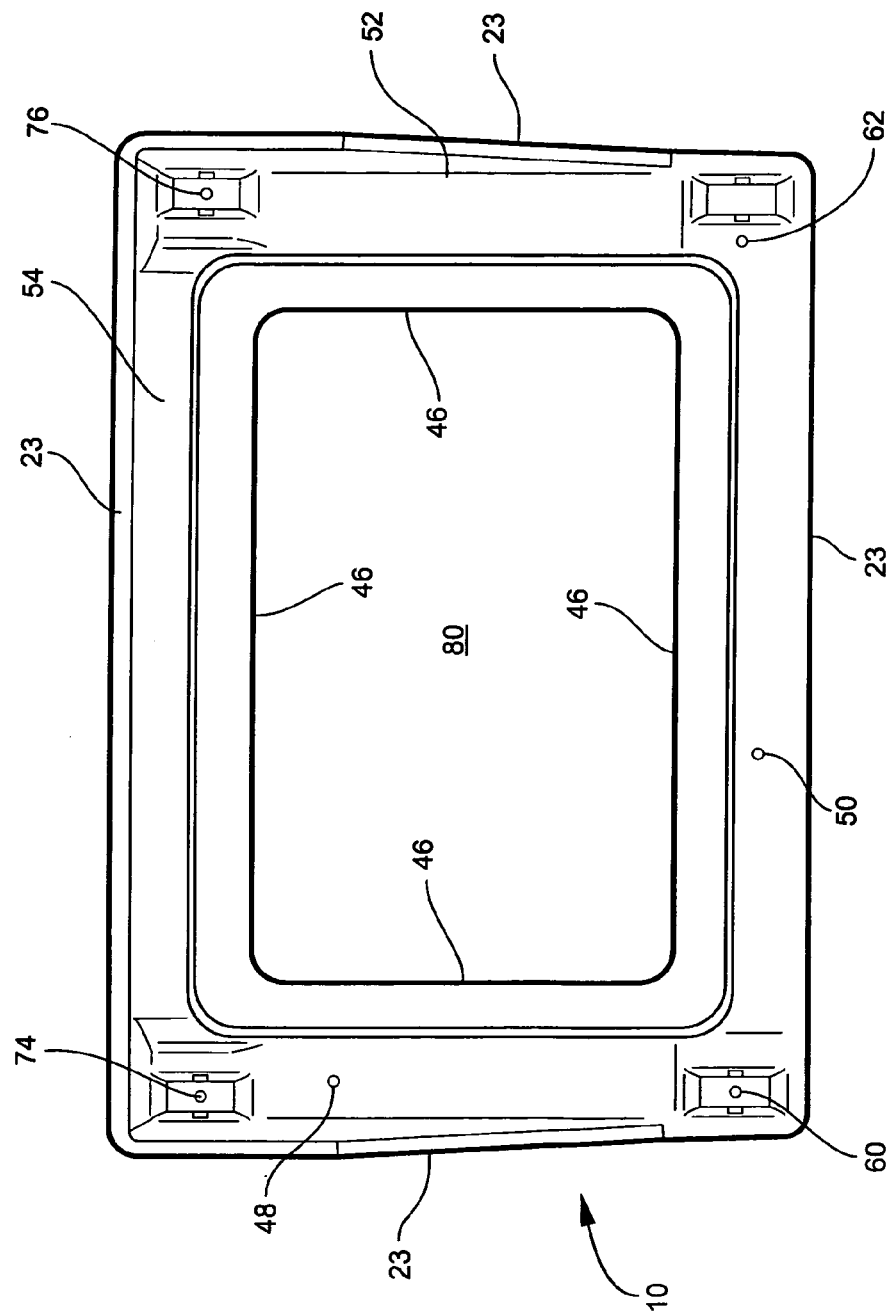
FIG. 5 is a bottom view of the solar panel mounting unit of FIG. 2 taken along the lines 5-5.

With reference to FIG. 1 and FIGS. 2-5, the present invention comprises a stackable ballasted roof mounted solar panel mount unit 10. The ballasted unit is integrally formed into a single molded piece. By integrally formed, it is meant that the piece is molded and contoured from a sheet that is preferably a single unitary piece, but may include multiple pieces that are adhered together into a single piece that cannot be separated without destroying the integrity and function of the piece. For example and without limitation, the piece could not be separated without cutting the mount unit 10. The mount unit 10 is made of fiberglass in one embodiment. In another embodiment, it is made of plastic such as polyethylene and polypropylene preferably high density polyethylene and high density polypropylene or blends of polypropylene or polyethylene of any density. In one embodiment the mount unit is formed from a composite that is capable of being molded into the desired shape. For example, graphite composites or other high strength composites known to a person of ordinary skill in the art may be suitable in one embodiment.

The mount unit 10 forms a plurality of generally elevated side walls 12, 14, 16, or 18 of a ballast receiving basket 21. Each of the generally elevated side walls taper upward and inward from a generally downward facing peripheral edge 23 to respective apex ridges 28, 30, 32, and 34 of the wall to form the outer face 20, 22, 24, 26 of each of the side walls 12, 14, 16, and 18. The generally elevated side walls taper downward and inward from the apex ridges of the walls to form the inner faces 12B, 14B, 16B and 18B. The side walls further extend inward from the base of the inner face to form a ballast supporting basket lip 46. With reference to the bottom view of FIG. 5, each side wall 12, 14, 16 and 18 defines a plurality of downwardly facing open channels 48, 50, 52, and 54 that are configured to receive a corresponding side wall from a corresponding solar panel mount in a stacking relation.

The mount unit 10 further comprises a first pair of posts 56 and 58, wherein each of the first pair of posts 56 and 58 extend upward from the peripheral edge 23 to the top 60 and 62 of the first pair of posts 56 and 58 at a first predetermined height above the generally elevated side walls 12, 14, 16 and 18 to form the outer side of each of the first pair of posts 56 and 58. Each of the first pair of posts 56 and 58 taper downwardly and inwardly from the top of each of the first pair of posts to form the generally inner side of each of the posts 56 and 58. Each of the first pair of posts 56 and 58 forms a downwardly facing post receiving first pair of mouths 60 and 62 (See FIG. 5) that is configured to receive a corresponding post from a corresponding first pair of posts of a corresponding solar panel mount in a stacking relation.

In one embodiment, the mount unit 10 further comprises a second pair of posts 66 and 68. Each of the second pair of posts 66 and 68 extend upward from the peripheral edge 23 to the top 70 and 72 of the second pair of posts at a second predetermined height to form the outer side of the support posts 66 and 68. The support posts 66 and 68 taper downwardly and inwardly from the second predetermined height to form the generally inner side of each of the posts 66 and 68. The second predetermined height is above the generally elevated side walls 12, 14, 16, and 18. Each of the second pair of posts 66 and 68 forms a downwardly facing post receiving mouths 74 and 76 (See FIG. 5) that is configured to receive a corresponding post from a corresponding solar panel mount in a stacking relation.

The mounting unit of one embodiment where the peripheral edge has a plurality of raised gaps 78 around the base to allow water to flow under the base without obstruction.

The mounting unit of another embodiment, wherein the basket has a large hollow part that is cut away 80 to prevent water from pooling in the basket.

Figure 6:
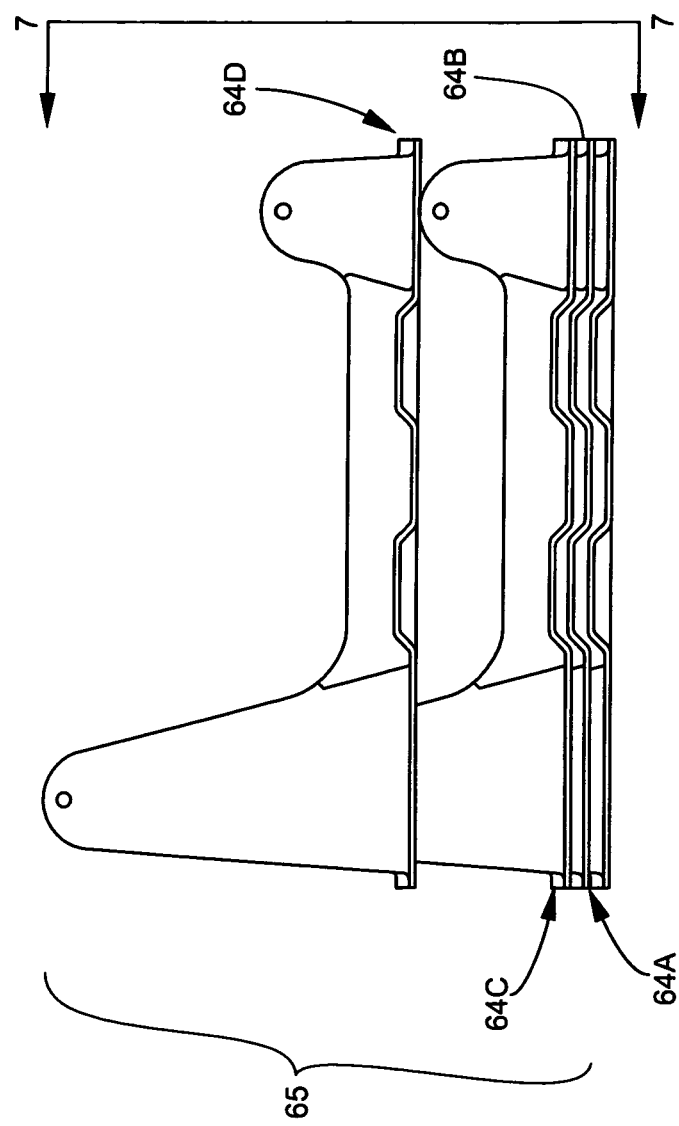
FIG. 6 is a side elevated view of a stack of solar panels of one embodiment.
Figure 7:
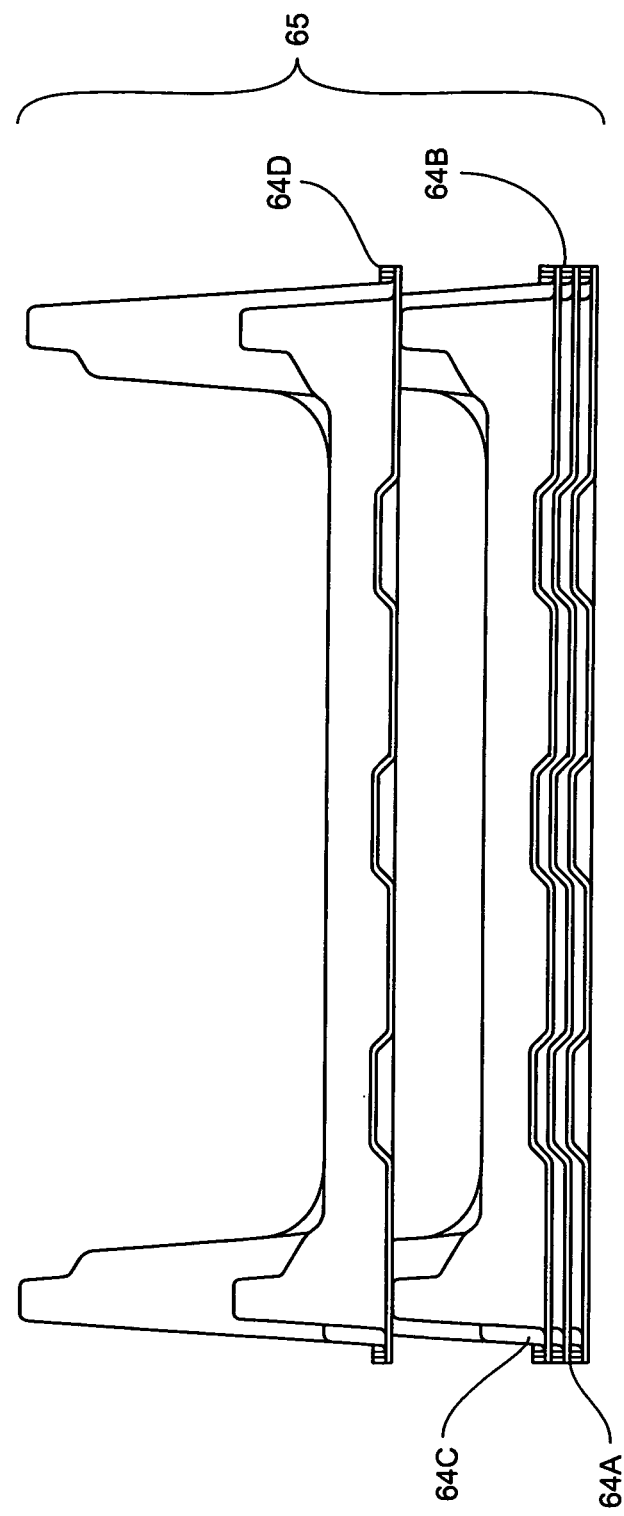
FIG. 7 is a front elevated view of the stack of solar panels of FIG. 6 taken along the lines of 7-7.
Figure 8:
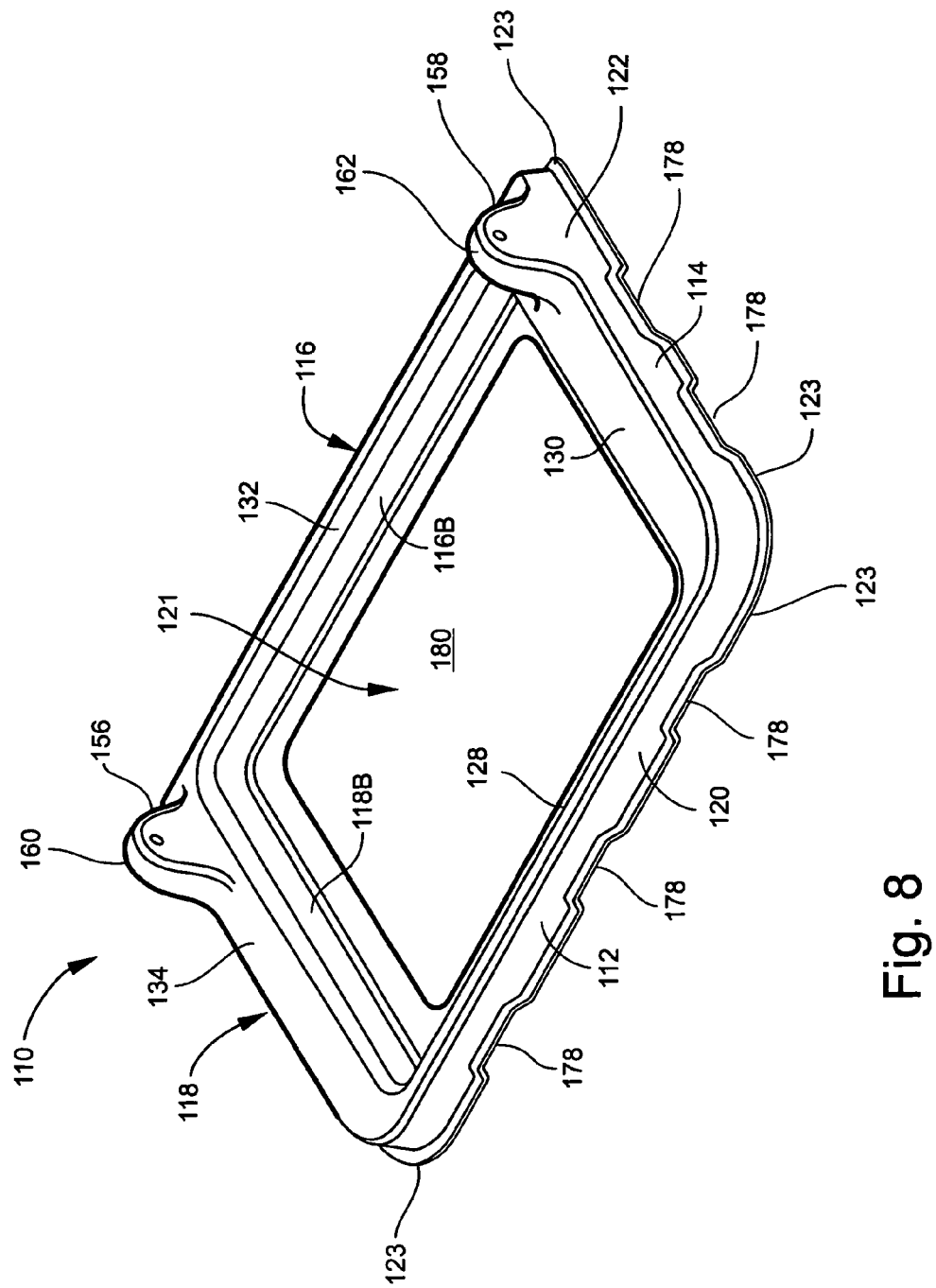
FIG. 8 is a perspective view of a two posted mounting unit of one embodiment of the present invention.
Figure 11:
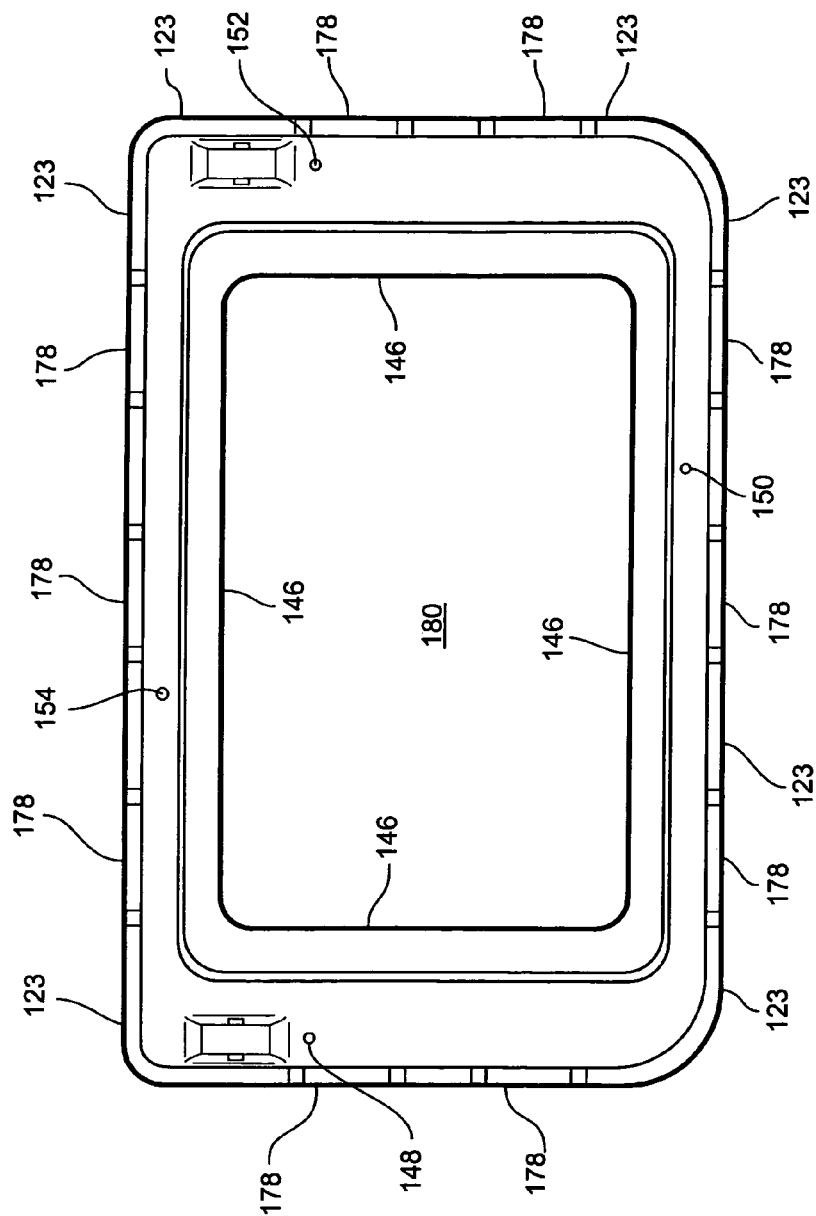
FIG. 11 bottom view of the solar panel mounting unit of FIG. 9 taken along the lines 11-11.
Figure 12:
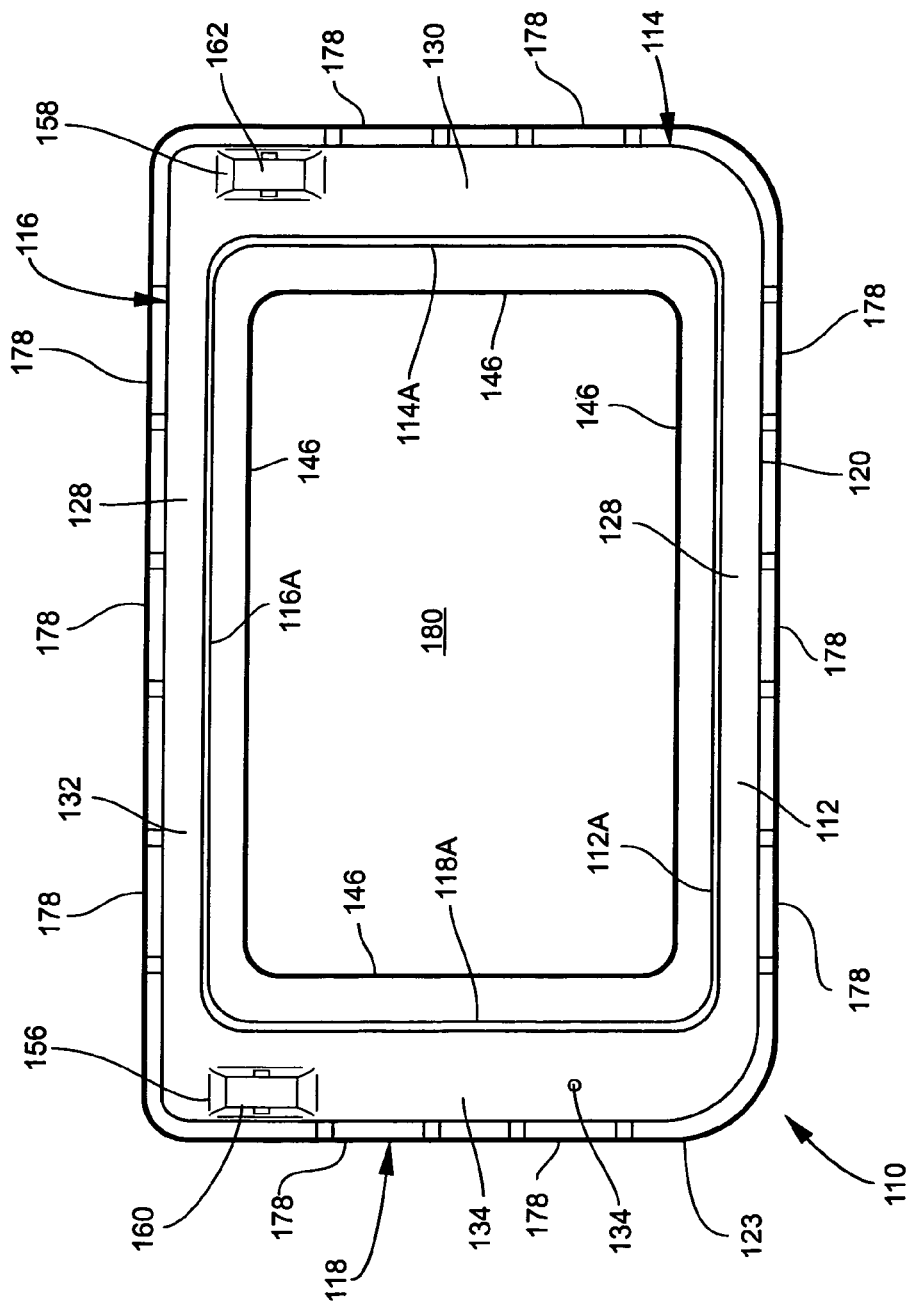
FIG. 12 is a bottom view of the solar panel mounting unit of FIG. 9 taken along the lines 12-12.

With reference to FIGS. 6 and 7, there are a plurality of units 64A, 64B, 64C, and 64D according to one or more of the embodiments set forth above. The plurality of units 64A, 64B, 64C, and 64D is arranged in a single vertically aligned stack 65. A first unit 64A of the plurality of units 64A, 64B, 64C, and 64D is placed onto the bottom and a second unit 64B of the plurality of units is vertically aligned with the first unit 64A of the plurality of units. The distance between any point on the first of the plurality of units and the same corresponding point on the second of the plurality of units is less than one-half, preferably less than one quarter, more preferably less than one-eighth, and even more preferably less than one tenth of the height of the distance from the peripheral lip to the apex ridge of any one unit.

The mounting unit of one embodiment where the peripheral edge has a plurality of raised gaps 78 around the base to allow water to flow under the base without obstruction.

The mounting unit of another embodiment, wherein the basket 21 has a large hollow part that is cut away 80 to prevent water from pooling in the basket.

With reference to FIGS. 8-12, the present invention comprises a stackable ballasted roof mounted solar panel mount unit 110. The ballasted unit is integrally formed into a single molded piece. By integrally formed, it is meant that the piece is molded and contoured from a sheet that is preferably a single unitary piece, but may include multiple pieces that are adhered together into a single piece that cannot be separated without destroying the integrity and function of the piece. For example and without limitation, the piece could not be separated without cutting the mount unit 110. The mount unit 110 is made of fiberglass in one embodiment. In another embodiment, it is made of plastic such as polyethylene and polypropylene preferably high density polyethylene and high density polypropylene or blends of polypropylene or polyethylene of any density. In one embodiment the mount unit is formed from a composite that is capable of being molded into the desired shape. For example, graphite composites or other high strength composites known to a person of ordinary skill in the art may be suitable in one embodiment.

The mount unit 110 forms a plurality of generally elevated side walls 112, 114, 116, or 118 of a ballast receiving basket 121. Each of the generally elevated side walls taper upward and inward from a generally downward facing peripheral edge 123 to respective apex ridges 128, 130, 132, and 134 of the wall to form the outer face 120, 122, 124, 126 of each of the side walls 112, 114, 116, and 118. The generally elevated side walls taper downward and inward from the apex ridges of the walls to form the inner faces. The side walls further extend inward from the base of the inner face 112B, 114B, 116B, 118B to form a ballast supporting basket lip 146. With reference to the bottom view of FIG. 5, each side wall 112, 114, 116 and 118 defines a plurality of downwardly facing open channels 148, 150, 152, and 154 that are configured to receive a corresponding side wall from a corresponding solar panel mount in a stacking relation.

The mount unit 110 further comprises a first pair of posts 156 and 158, wherein each of the first pair of posts 156 and 158 extend upward from the peripheral edge 123 to the top 160 and 162 of the first pair of posts 156 and 158 at a first predetermined height above the generally elevated side walls 112, 114, 116 and 118 to form the outer side of each of the first pair of posts 156 and 158. Each of the first pair of posts 156 and 158 taper downwardly and inwardly from the top of each of the first pair of posts to form the generally inner side of each of the posts 156 and 158. Each of the first pair of posts 156 and 158 forms a downwardly facing post receiving first pair of mouths 160 and 162 (See FIG. 11) that is configured to receive a corresponding post from a corresponding first pair of posts of a corresponding solar panel mount in a stacking relation.

The mounting unit basket 121 has a large hollow part that is cut away 180 to prevent water from pooling in the basket.

Figure 14:
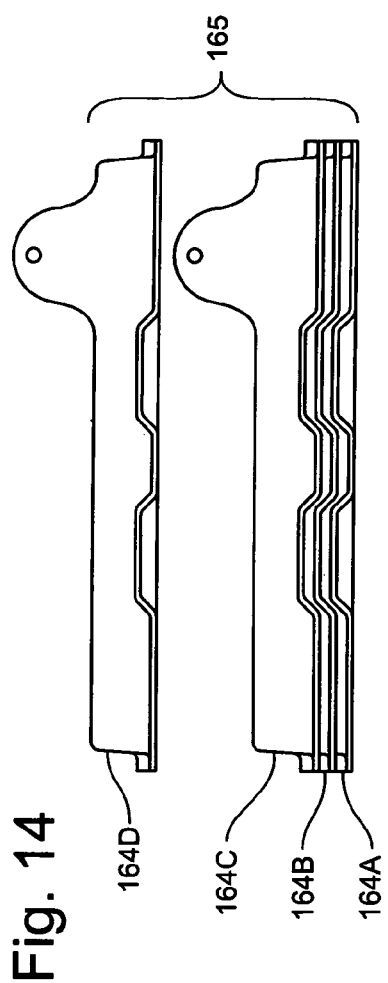
FIG. 14 is a side elevated view of the solar panel mounting units of FIG. 13 taken along the lines 14-14.
Figure 13:
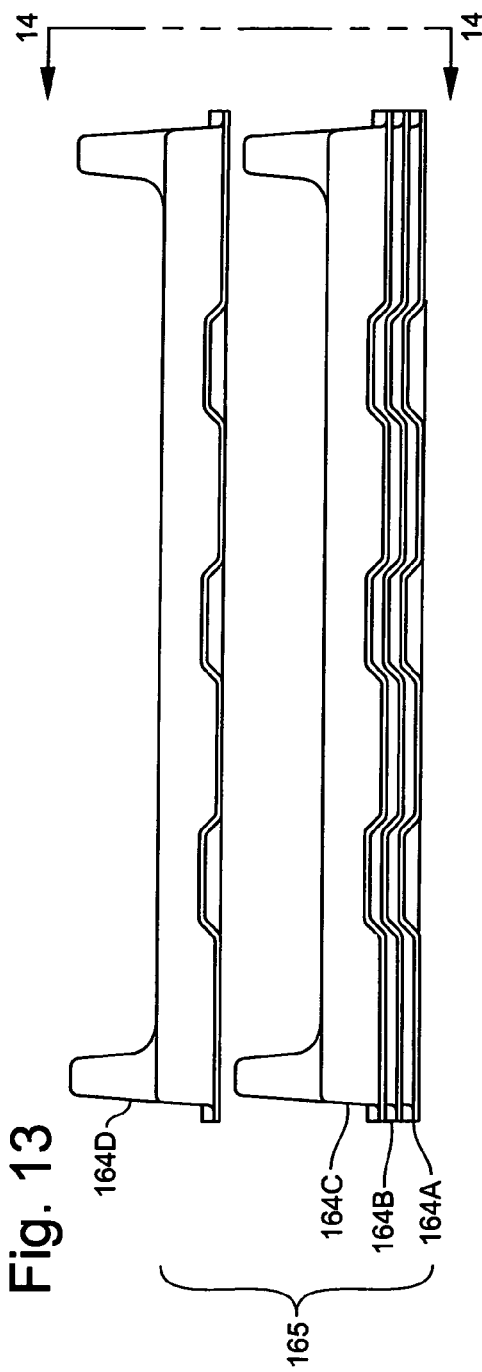
FIG. 13 is a front view of a stack of solar panel mounting units of one embodiment.
Figure 17:
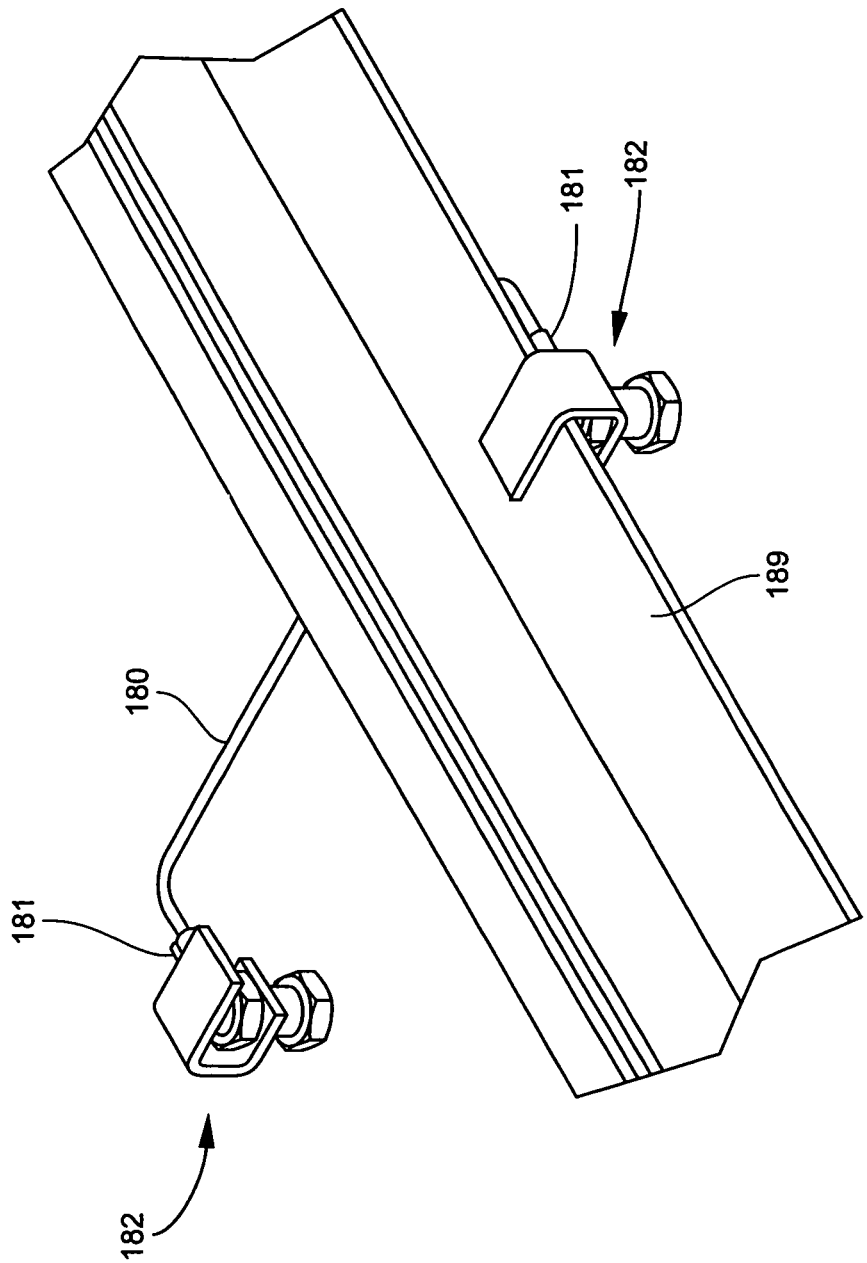
FIG. 17 is a perspective view of a panel grounding system of the present invention.
Figure 18:
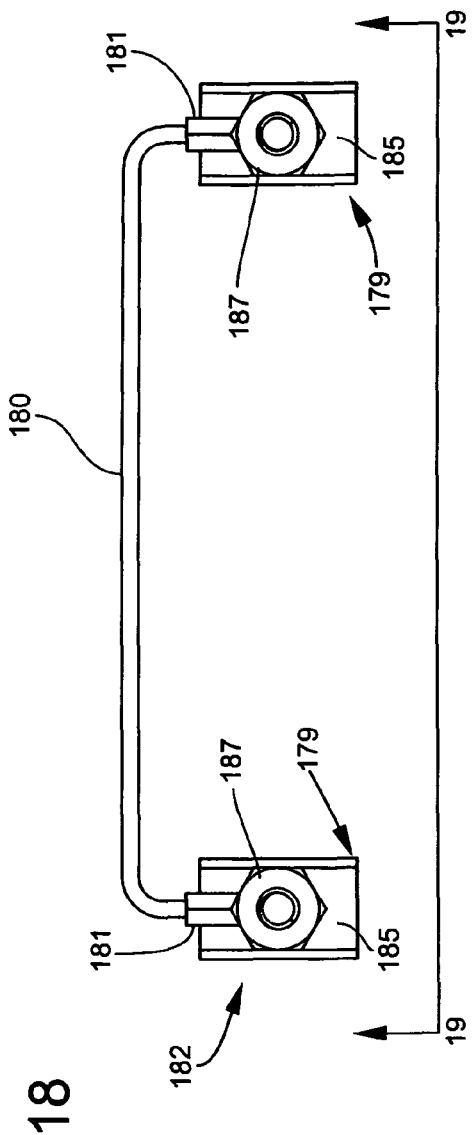
FIG. 18. is an elevated view of the grounding system including grounding wire and grounding clamps of one embodiment.
Figure 19:
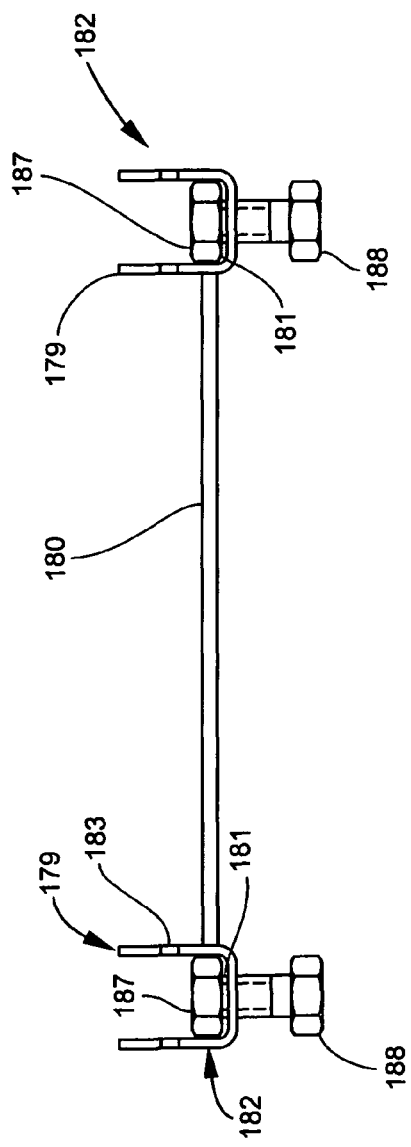
FIG. 19 is an end view of the system of FIG. 18 taken along the lines of 19-19.
Figure 23:
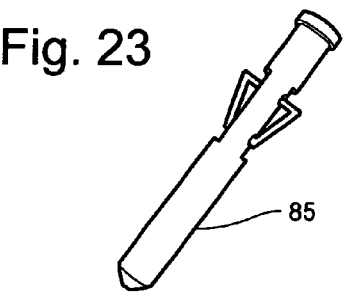
FIG. 23 is one embodiment of a pin fastener for tool-less assembly according to of the present invention.

With reference to FIGS. 13 and 14, there is a plurality of units 164A, 164B, 164C, and 164D according to one or more of the embodiments set forth above. The plurality of units 164A, 164B, 164C, and 164D is arranged in a single vertically aligned stack 65. A first unit 164A of the plurality of units 164A, 164B, 164C, and 164D is placed onto the bottom and a second unit 64B of the plurality of units is vertically aligned with the first unit 164A of the plurality of units. The distance between any point on the first of the plurality of units and the same corresponding point on the second of the plurality of units is less than one-half, preferably less than one quarter, more preferably less than one-eighth, and even more preferably less than one tenth of the height of the distance from the peripheral lip to the apex ridge of any one unit.

The method of installing an array 95 of solar panels is illustrated with reference to FIGS. 15, 16 and 23-36. Installation begins following a site plan indicating where the panels are to be located. A chalk line is snapped to square and center the system. The chalk line represents the line along which the front row mounting units are aligned.

There is a front row mounting unit 82 and a first medial row mounting unit 81 aligned behind the front row mounting unit 82. The front row mounting unit has a first pair of posts 84. The first medial row mounting unit 81 has a first pair of posts 88 and a second pair of posts 83. A rail 86 is shown extending from one of the first posts 84 of the front row mounting unit 82 to the second posts of the first medial row mounting units 81. The rail 86 is fastened to the posts by a fastener known in the art. In one embodiment the fastener is a pin fastener 85 that is the subject of U.S. Patent Appl. No. 61/548,024 filed Oct. 17, 2011, which is incorporated herein by reference in its entirety.

In another embodiment, it is a clevis pin, a detent pin, a locking pin, a hitch pin or a nut and bolt.

With reference to FIG. 16 and FIGS. 26a through 26d illustrating how a solar panel 90 having a lipped frame 91 is fastened to a rail 86. The rail 86 is configured with a pair of fastener clamps 87 and 89 that fasten the solar panel 90 to the rail 86. Step one 26a of the fastening procedure places the lip 92 of the frame 91 on the rail 86 in front of the clamp 89 in its desired position.

Figure 26A:
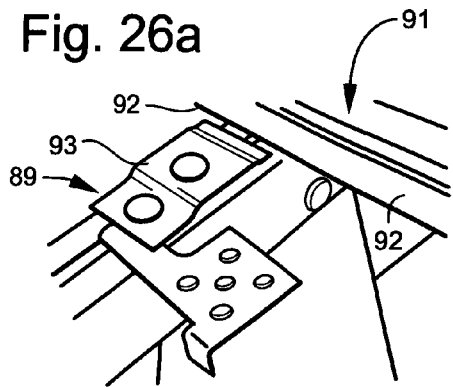
FIG. 26a-d shows a process for affixing a solar panel to supporting rails by a tool-less fastener according to one embodiment of the present invention.
Figure 26B:
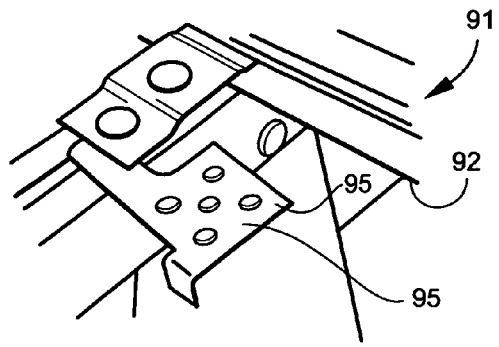
Figure 26C:
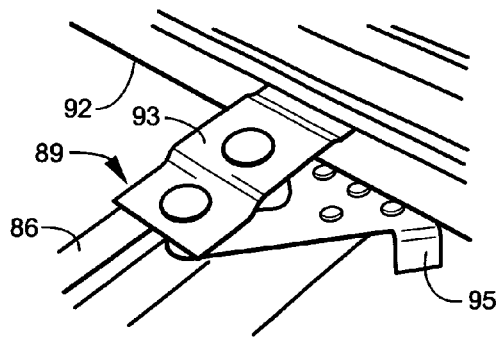
Figure 26D:
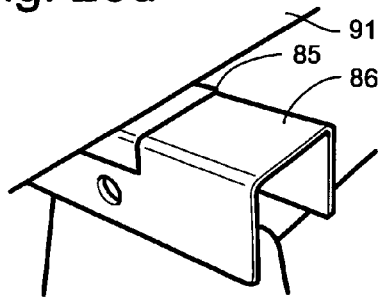

Then the clamp mechanism 89 is slid forward until the lip 92 of the frame 91 is positioned between a top clamp plate 93 and the rail 94 surface as shown in FIG. 26b. A wedge plate 95 is pivoted into position between the bottom surface of the lip 92 and the top surface of the rail 94. This wedge action clamps the frame 91 to the rail 94 thereby securing the solar panel to the mounting system.

Figure 24:
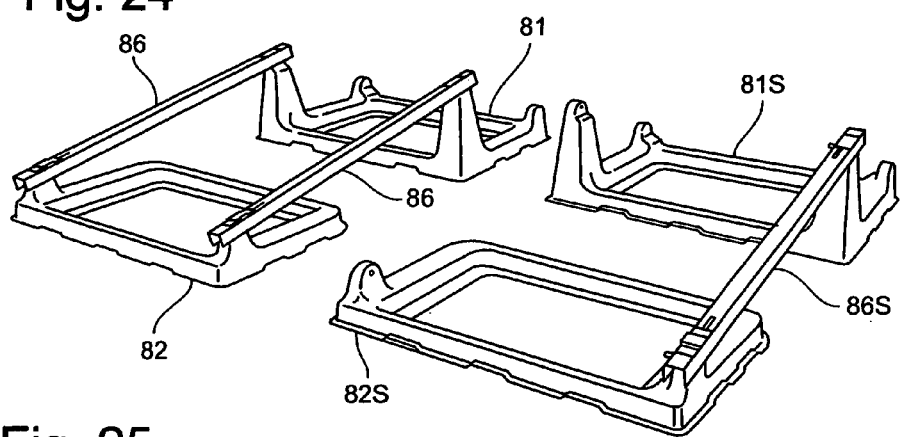
FIG. 24 shows four mounting units partly assembled with supporting rails.

With continued reference to FIG. 24, the mount/rail configuration of the outside row (designated S) requires only one rail 86S extended between the front row mounting unit 82S and a medial row mounting unit 86S and fastened preferably by a fastener 85. Space apart just less than three-fourths of a panel length from the outside rail 86S, is a second set of a front row mounting unit 82, a medial row mounting unit 81 and a pair of rails 86 extending from each of the pair of posts of the front row mounting unit 82 to the tall posts of the medial row mounting unit. Likewise, in one embodiment, the rails are fastened by a tool-less pin fastener 85.

Figure 25:
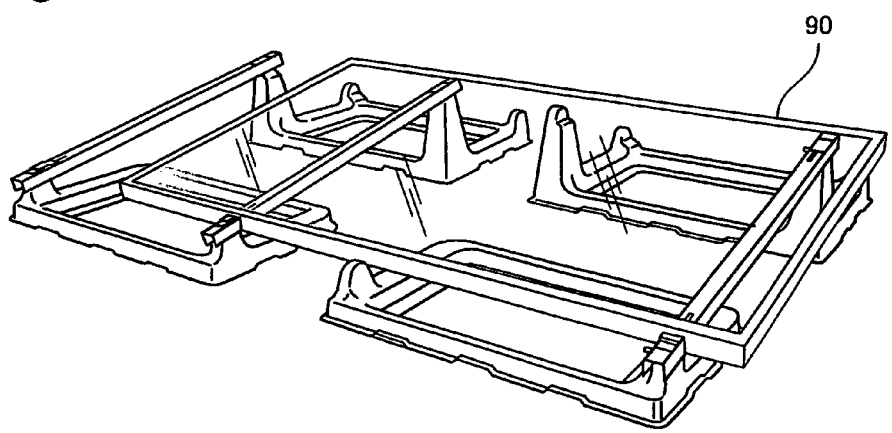
FIG. 25 shows the mounting units of FIG. 24 with a solar panel affixed to supporting rails.

With further reference to FIG. 25, a panel 90 is placed over rail 86S and the adjacent rail 86S. The medial facing edge of each panel should be positioned equidistance between the legs of the respective baskets.

Figure 27:
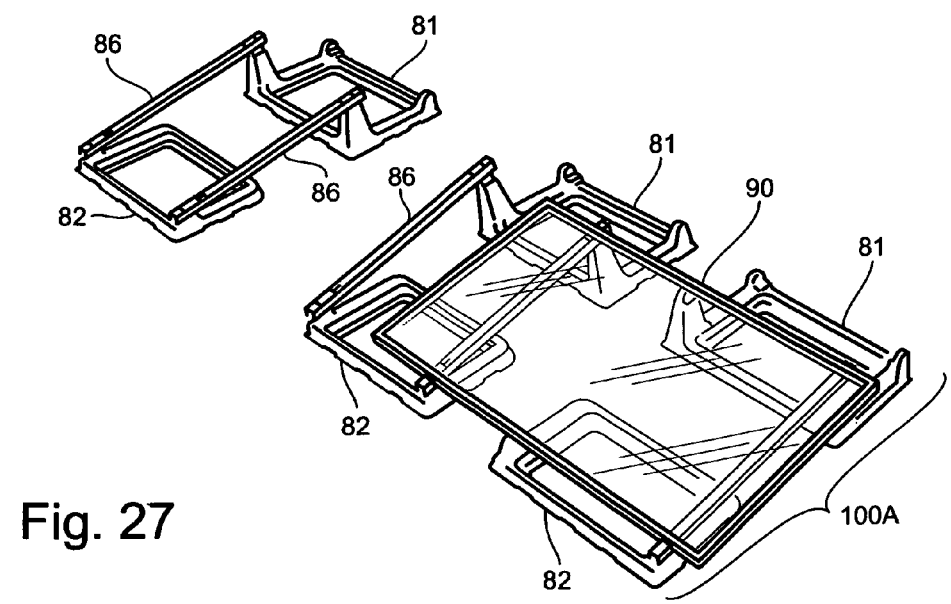
FIG. 27-36 illustrate the sequential assembly of a solar panel supporting system of FIG. 25.

Turning now to FIG. 27, the first row 100A of basket is continued in the same manner illustrated in FIG. 25, by placing an additional set of supports including a front row mounting unit 82, a medial row mounting unit 81 connected by a pair of rails 86 fastened in one embodiment by tool-less pin fastener 85.

Figure 28:
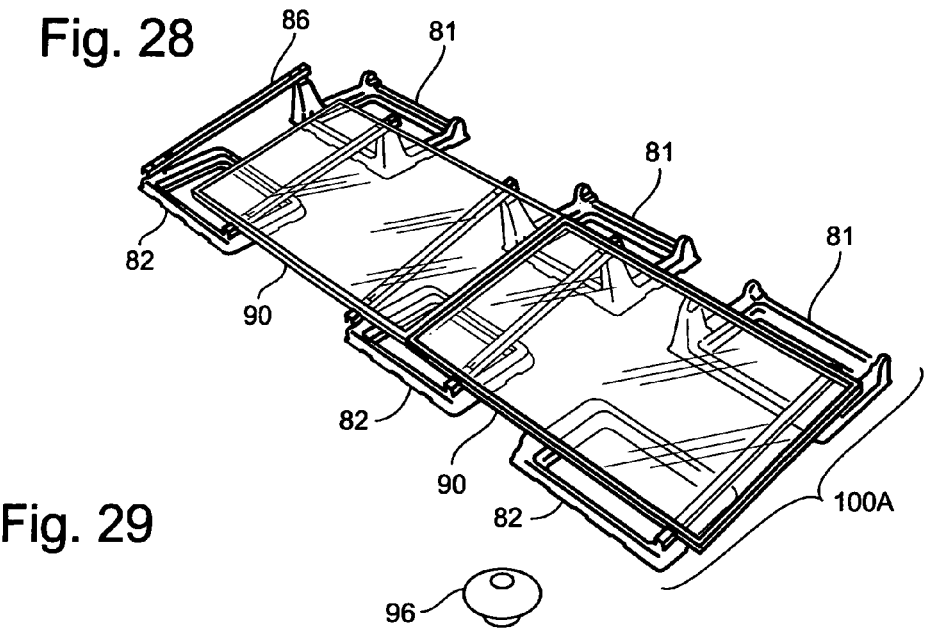
Figure 29:
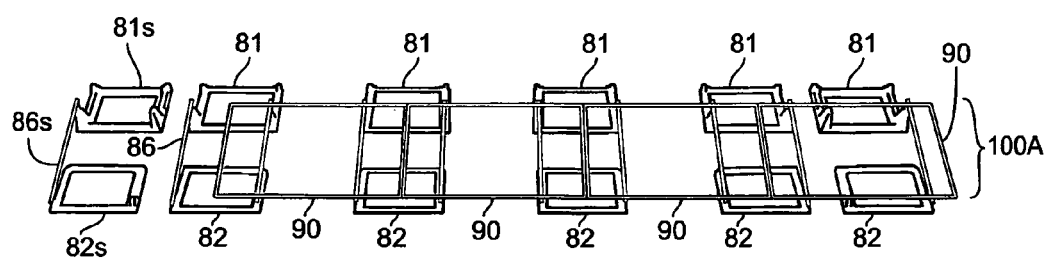
Figure 30:
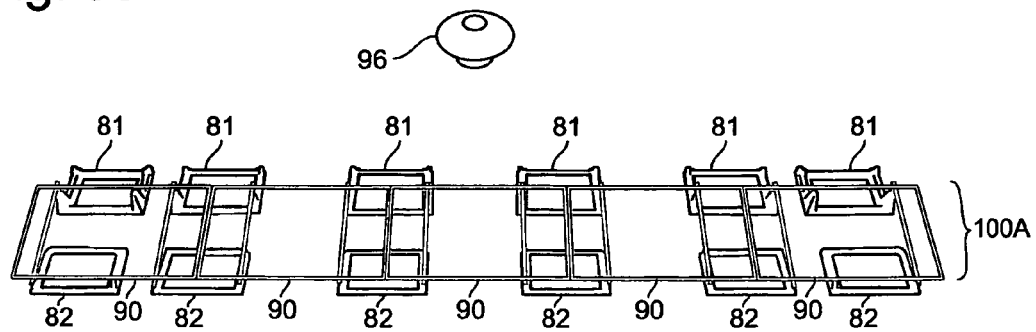
Figure 31:
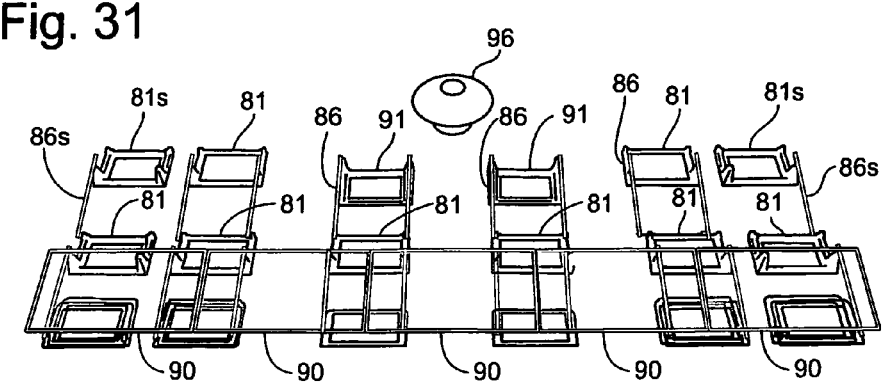

As shown in FIG. 28, a second panel 90 is positioned adjacent the first panel 90 and fastened to a pair of rails 86 as hereinbefore described in one embodiment. FIG. 29 illustrates that the first row 100 A continues by following the pattern described above with reference to FIGS. 24 through 27 until the last set of a first row mounting unit 82S connected to a medial row mounting unit 81 by a single rail 86S on the outside edge. The last panel 90 is affixed as shown in FIG. 30. In each instance, the baskets of any mounting unit are filled with ballasts prior to attaching the panel.

Figure 32:
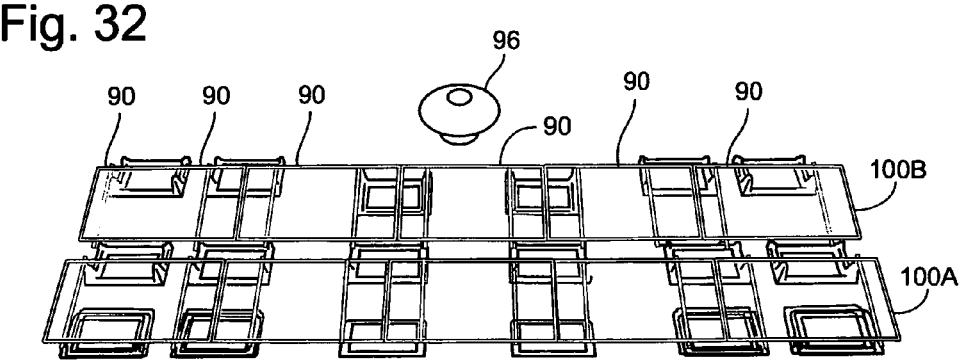

The second row 100B is altered due to a rooftop obstruction 96 that will interfere with the placement of the third row. A row of medial row mounting units 81 are placed behind the previous row of medial row mounting units 81 in row 100B with the long legs positioned towards the previous row. Two mounting units 98 are turned in opposite direction with the small legs positioned towards the previous row, but the long legs these reverse position mounting units 98 are aligned with the long legs of the other medial row mounting units 81 in the second row 100B. Rails 86 are fastened—preferably by tool less fasteners 85—to the mounting units 81 or 98. The side mounting units 81S are attached with only one rail 86S. A row of panels are added as shown in FIG. 32 after ballasts are placed in the basket of the mounting units 81 or 98.

Figure 33:
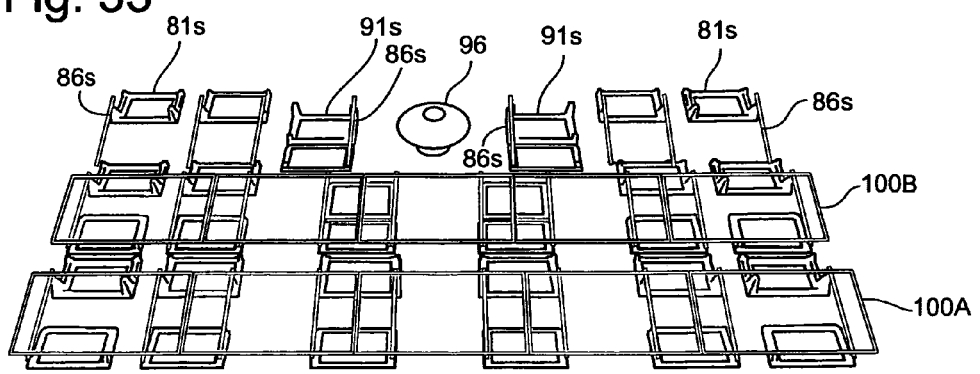

With reference to FIG. 33, a third row 100C is started by placing an additional row of medial mounting units 81 behind the preceding row of mounting units 81. Any time that the mounting unit (81 or 82) cannot be connected to a preceding row, a front row mounting unit 82 is placed in position. Any time, the mounting unit (81 or 82) is connected to a unit in front of it and behind it, a medial row mounting unit 81 is used with the tall legs positioned towards the preceding row so that the basket will be positioned behind the solar panels 91 when fully assembled. Any time the mounting unit (81 or 82) is expected to be connected to a mounting unit the previous row, but not expected to be connected to mounting unit behind it, then the mounting unit 91 with four legs is selected and positioned with the small legs adjacent the front of the array so that the basket of the mounting unit 91 is positioned under the solar panel 90 when fully assembled.

Figure 34:
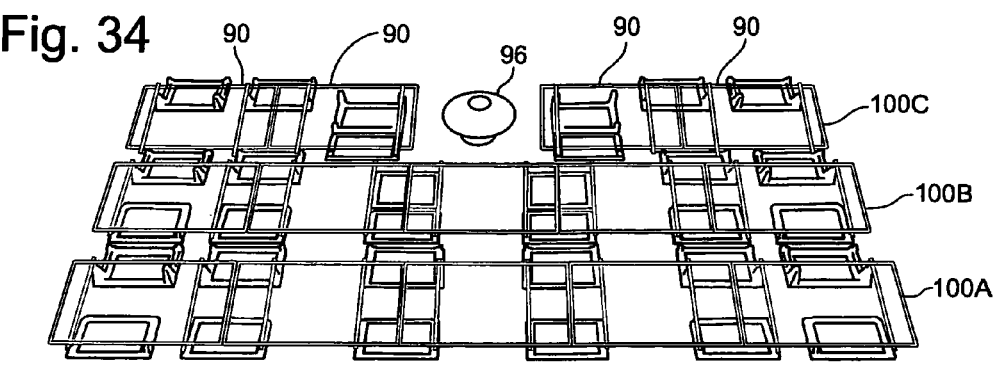

Then, rails are attached between the small posts in front and the tall posts behind. Then, as shown in FIG. 34, ballasts weights can be placed in the basket and the panels 90 can be fastened to the rails to complete the third row 100C.

Figure 35:
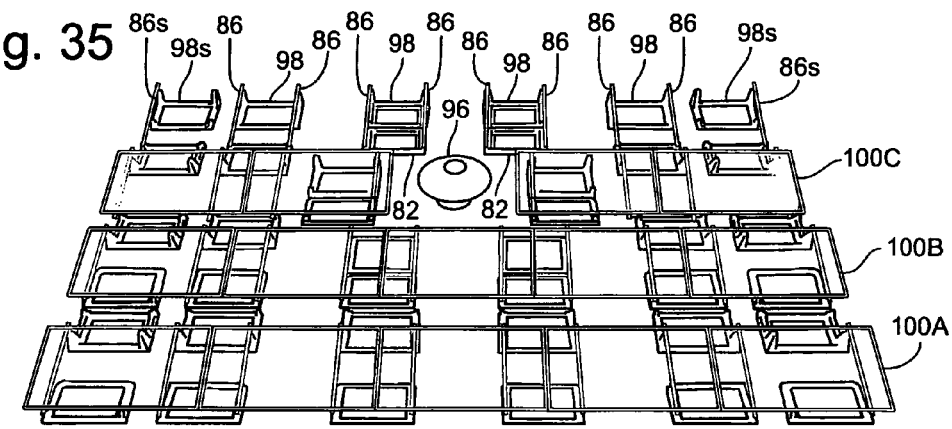
Figure 36:
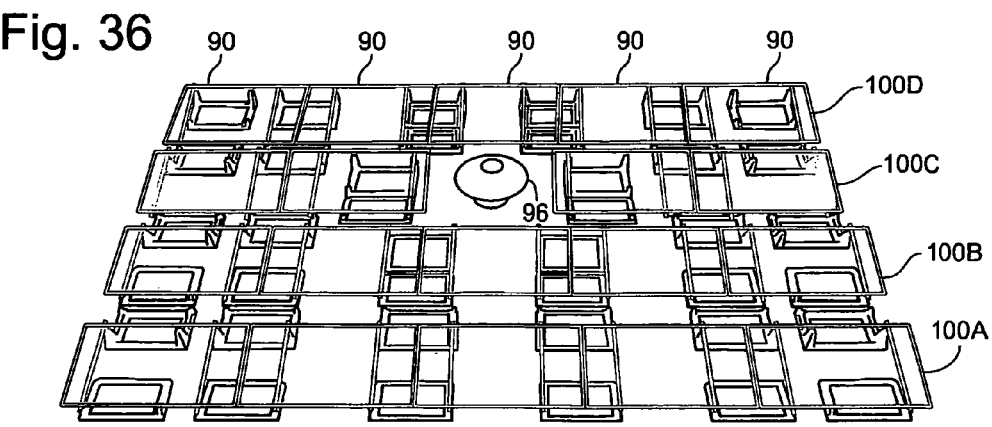

The fourth row 100D is added with reference to FIGS. 35 and 36. The mounting units 91 in the last row is positioned with the small legs forward so that the basket is oriented under the panel 91. If the basket cannot connect to the previous row, then a first row mounting unit 82 can be used in front of the mounting unit 91 to accommodate attachment of the panel. Once the panels are in place, ballasts can be placed in the basket and the solar panels 92 can be connected to complete the row 100D.

The system also has a plurality of ground wires and related fasteners explained with reference to FIGS. 17-22. The ground wire 180 is formed with two wire terminals. In one embodiment the wire terminals are ring wire terminals 181 that are affixed to respective ends of the ground wires by a crimp fitting. The ground wires are clamped by a ground wire clamp apparatus 182 having a C-clamp housing 179 defining a first clamping surface 183 and a second clamping surface 185. The first clamping surface of one embodiment is flat. The first clamping surface of another embodiment is knurled or otherwise textured. In one embodiment the first clamping surface 183 is formed with teeth 184. The second clamping surface 185 has a hole 186 that receives a nut 187 and bolt 188 through the hole 186. The bolt 188 extends through the ring wire terminal 181 and the ring wire terminal 181 is placed between the second clamping surface 185 and the nut 187. The bolt 188 is freely rotatable and slidable along the axis of the bolt 188 in the C-clamp housing 179. The nut 187 is slidably but not rotatably received in the C-clamp housing 179 so that rotation of the bolt 188 relative to the C-clamp housing 179 and the nut 187 in a tightening direction causes the nut 187 to impinge against and clamp the ring wire terminals 181 to clamp the terminal and cause an electrical connection between the terminal and the C-clamp housing.

Likewise rotation of the bolt 188 relative to the nut 187 and the C-clamp housing 179 causes the end of the bolt to move towards the first clamping surface 183. When an edge of the solar panel frame 189 is placed between the end of the bolt 188 and the first clamping surface 183, the bolt forces the first clamping surface 183 and the respective teeth 184 against the side of the panel frame 189. The teeth 184 penetrate the annealing surface of the frame 189 to form a reliable electrical connection between the panel frame and the C-clamp. Thus, by use of the ground wire and clamping mechanism, a plurality of solar panel frames can be adequately grounded together.

What is claimed is:

1. A stackable ballasted roof mounting solar panel mount unit integrally formed into a single piece comprising:
   a plurality of generally elevated side walls of a ballast receiving basket, wherein each of the generally elevated side walls taper upward and inward from a generally downward facing peripheral edge to an apex ridge of each of the generally elevated side walls to form an outer face and then tapers downward and inward from the apex ridge of each of the generally elevated side walls to form an inner face and further extends inward from the base of the inner face to form a ballast supporting basket lip, wherein each of the generally elevated side walls define a downwardly facing open channel that is configured to receive a corresponding side wall from a corresponding solar panel mount in a stacking relation; and
   a first pair of posts, wherein each of the first pair of posts extend upward from the peripheral edge to the top of the first pair of posts at a first predetermined height above the generally elevated side wall to form the outer side of each of the first pair of posts, wherein each of the first pair of posts taper downwardly and inwardly from the top of each of the first pair of posts to form the generally inner side of each of the posts, wherein each of the first pair of posts forms a downwardly facing post receiving first mouth that is configured to receive a corresponding post from a corresponding first pair of posts of a corresponding solar panel mount in a stacking relation.

2. The unit of claim 1, further comprising:
   a second pair of posts, wherein each of the posts extend upward from the peripheral edge to a first predetermined height above the generally elevated side wall to form the outer side of a support post, wherein the support posts taper downwardly and inwardly from the predetermined height to form the generally inner side of each of the posts, wherein each post forms a downwardly facing post receiving mouth that is configured to receive a corresponding post from a corresponding solar panel mount in a stacking relation.

3. The plurality of units of claim 2, wherein the plurality of units are arranged in one vertically aligned stack, wherein a first of the plurality of units is placed directly onto the pallet on the bottom of the stack and a second of the plurality of units is vertically aligned with and stacked upon the first of the plurality of units, wherein the distance between any point on the first of the plurality of units and the same corresponding point on the second of the plurality of units is less than ½ the height of the distance from the peripheral lip to the apex ridge of any one unit.

4. The plurality of units as set forth in claim 3, wherein unassembled rails and other hardware can be stacked between the first pair of posts and the second pair of posts in the plurality of stacked units on the pallet.

5. The unit of claim 2, wherein the unit is made of fiberglass.

6. The mount of claim 1, wherein the peripheral edge has a plurality of raised gaps around the base to allow water to flow under the base without obstruction.

7. The unit of claim 1, wherein the basket has a large hollow part that is cut away to prevent water from pooling in the basket.

8. The unit of claim 1, wherein the unit is made of fiberglass.

9. A plurality of units wherein each unit comprises:
   a plurality of generally elevated side walls of a ballast receiving basket, wherein each of the generally elevated side walls taper upward and inward from a generally downward facing peripheral edge to an apex ridge of each of the generally elevated side walls to form an outer face and then tapers downward and inward from the apex ridge of each of the generally elevated side walls to form an inner face and further extends inward from the base of the inner face to form a ballast supporting basket lip, wherein each of the generally elevated side walls define a downwardly facing open channel that is configured to receive a corresponding side wall from a corresponding solar panel mount in a stacking relation; and a first pair of posts, wherein each of the first pair of posts extend upward from the peripheral edge to the top of the first pair of posts at a first predetermined height above the generally elevated side wall to form the outer side of each of the first pair of posts, wherein each of the first pair of posts taper downwardly and inwardly from the top of each of the first pair of posts to form the generally inner side of each of the posts, wherein each of the first pair of posts forms a downwardly facing post receiving first mouth that is configured to receive a corresponding post from a corresponding first pair of posts of a corresponding solar panel mount in a stacking relation wherein the plurality of units are arranged in a single vertically aligned stack, wherein a first of the plurality of units is placed onto the bottom and a second of the plurality of units is vertically aligned with the first of the plurality of units, wherein the distance between any point on the first of the plurality of units and a corresponding point on the second of the plurality of units is less than ½ the height of the distance from the peripheral lip to the apex ridge of any one unit.

10. The plurality of units as set forth in claim 9, wherein the plurality are arranged in one vertically aligned stack on a pallet.

11. The plurality of units of claim 10, wherein each unit is made of fiberglass.

12. The plurality of units of claim 9, wherein each unit further comprising:

a second pair of posts, wherein each of the posts extend upward from the peripheral edge to a first predetermined height above the generally elevated side wall to form the outer side of a support post, wherein the support posts taper downwardly and inwardly from the predetermined height to form the generally inner side of each of the posts, wherein each post forms a downwardly facing post receiving mouth that is configured to receive a corresponding post from a corresponding solar panel mount in a stacking relation.

13. The plurality of units of claim 9, wherein the peripheral edge of each unit has a plurality of raised gaps around the base to allow water to flow under the base without obstruction.

14. The plurality of units of claim 9, wherein the basket of each unit has a large hollow part that is cut away to prevent water from pooling in the basket.

15. The plurality of units of claim 9, wherein each unit is made of fiberglass.

* * * * *